Figure 1:
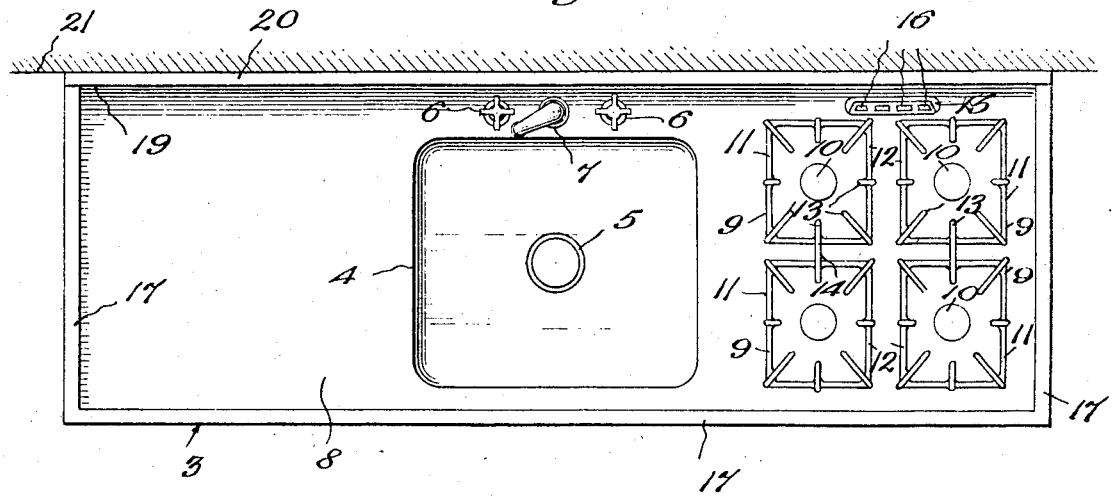

Oct. 31, 1939.   H. D. TIETZ   2,178,411
COMBINATION KITCHEN UNIT
Filed Nov. 16, 1937

INVENTOR.
HERBERT D. TIETZ
BY
ATTORNEY.

Patented Oct. 31, 1939

2,178,411

UNITED STATES PATENT OFFICE 2,178,411

COMBINATION KITCHEN UNIT

Herbert David Tietz, Maplewood, N. J., assignor to The International Nickel Company, Inc., New York, N. Y., a corporation of Delaware Application November 16, 1937, Serial No. 174,754

3 Claims. (Cl. 312—167)

The present invention relates to combination kitchen units, and more particularly to such a unit having a unitary sheet metal top member in which a sink is formed and which is provided with openings adapted to register with the top heaters of a kitchen range. A refrigerator may be included, if desired.

A modern kitchen is planned with a view to economy of space in the building as well as to economy of time and energy on the part of the housewife in going from one piece of kitchen equipment to another. In many instances, for example in small apartments, space is at a premium and every available inch must be utilized and made attractive to tenants.

A great deal of effort on the part of architects, engineers and inventors has been devoted to the problem of designing kitchens and kitchen equipment which would be compact and pleasing in appearance and yet which would be satisfactory in use. Many attempts have been made to provide combination units in which two or more of the usual pieces of kitchen equipment are combined, but none of these, so far as I am aware, has been completely satisfactory from the point of view of commercial production or ease of installation and all have had certain disadvantages in use.

I have invented a kitchen unit in which a sheet metal sink, a range and, if desired, a refrigerator are combined in novel manner to give a compact and convenient arrangement of these parts which is highly satisfactory in use, which is well adapted for production on a commercial and industrial scale and which is very readily installed.

It is an object of the present invention to provide a kitchen unit in which a sheet metal sink and range, and, if desired, a refrigerator are combined in a unitary structure which avoids the shortcomings of prior structures and which provides the art with a compact, practical and satisfactory kitchen unit.

It is another object of the invention to provide a kitchen unit having a unitary and seamless sheet metal top in which provision is made for the burners of a gas range and an exhaust for the products of combustion thereof, a sink and a drain-board.

It is a further object of the present invention to provide a kitchen unit having a unitary sheet metal top in which provision is made for a sink, a drainboard and the heaters of a kitchen range of a commercial type which can be slipped bodily into a space provided therefor in the cabinet structure under the unitary top.

The invention contemplates the provision of a kitchen unit having a cabinet framework covered by a unitary sheet metal top with the bowl of a sink pressed therein, the cabinet framework including a space at one end into which a commercial type kitchen range may be slipped bodily with the top heaters exposed through apertures in the unitary sheet metal top and a space at the other end in which a commercial type refrigerator may be inserted.

It is also within the contemplation of the invention to provide a kitchen unit combining a sheet metal sink, a kitchen range and, if desired, a refrigerator which is well adapted for production on a commercial and industrial scale, which is economical to manufacture and which is easy to install and keep sanitary in use.

Figure 2:
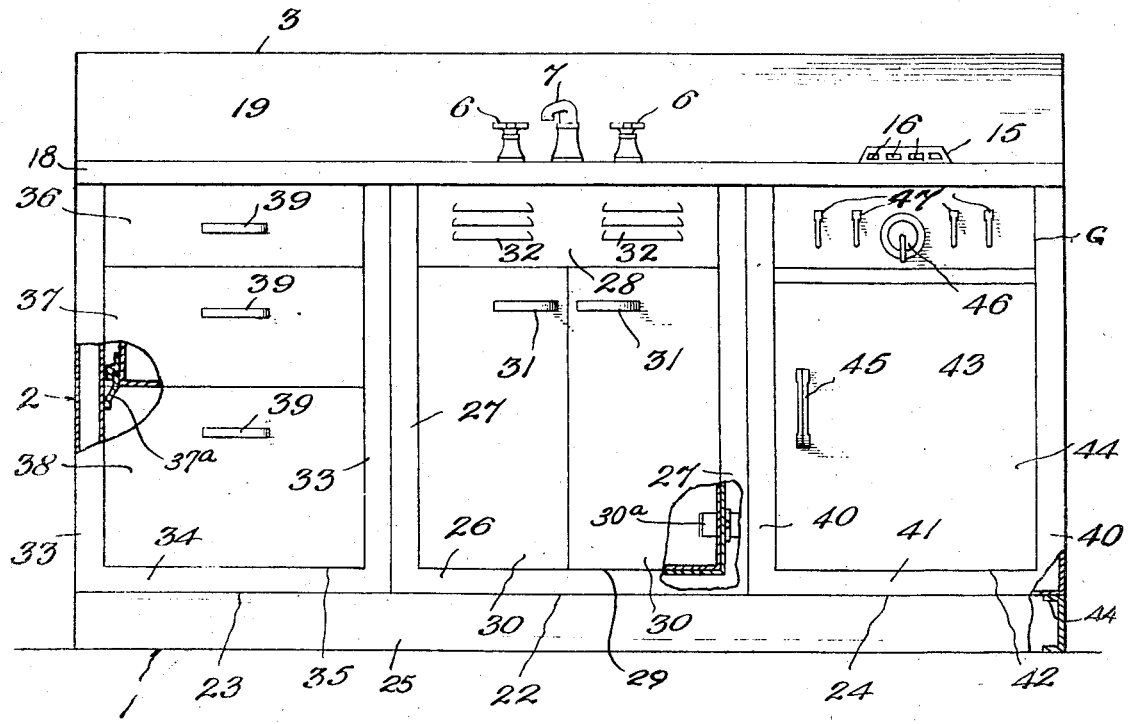

Other objects and advantages of the invention will become apparent from the following description taken in conjunction with the accompanying drawing, in which:

Fig. 1 depicts a plan view of a preferred embodiment of the present invention; and Fig. 2 illustrates a front elevational view thereof, with parts broken away to reveal certain details of construction.

Referring more particularly to the drawing, the reference character 1 represents generally the combination kitchen unit embodying the present invention. The unit comprises, broadly speaking, a cabinet structure 2 and a unitary sheet metal top member 3 which is seamless and free from cracks and crevices of prior art structures which tend to accumulate dirt, grease, etc.

The top 3 is provided with a sink bowl or basin 4 and a drain or outlet 5. The bowl 4 is preferably substantially centrally located within the top 3, and conventional hot and cold water faucets 6 are mounted on the top member adjacent the rear edge of the bowl. In the modification shown the two faucets have a common spout 7 which may be swung in a horizontal plane about a pivot. It will be understood, of course, that any desired type of faucet may be used and that they may be mounted either on the horizontal or vertical surface of the top 3.

At the left of the bowl 4 is a relatively large area which is seamless and smooth and which serves as a drain board for the sink. It is preferably sloped slightly downwardly toward the bowl so as to drain more readily and may, if desired, be provided with ridges or corrugations (not shown) as is well understood in the art.

At the right of the bowl 4 is a suitable area provided with a plurality of ports or apertures 9 which are adapted to mate, cooperate and register with burners 10 of a gas range G or the heating units of an electric range. The rims of the apertures are preferably turned under to form reinforcing flanges (not shown). Resting on top 3 and overlying each aperture 9 is a utensil support or grate 11 having a peripheral frame 12 and bars 13 integral therewith extending at one end radially toward the center of the grate and at least some of them projecting slightly beyond the frame 12 at the other end. These projecting ends rest on the member 3 and support the grate 11. The grates 11 are preferably cast metal and may be joined in pairs as at 14, if desired. The burners and grates may be of conventional type. Behind the burners is located a gas outlet exhaust port 15 having a plurality of apertures 16 therein which serve as a ventilation for the range to exhaust the products of combustion from the burning of gas by the burners. This gas outlet port is preferably pressed in the sheet metal top 3 and apertured as shown, but it may be a separate member set in an outlet in the top 3 provided for it.

At the two ends and the front of top 3 an integral raised rim 17 is provided which is bent down at the outer edge to provide a flange or apron 18. At the rear a vertical back 19 is provided which forms a single and integral splashback for the sink, drainboard and range. A flange 20 is provided at the top ends of the splashback 19 to give strength thereto and form a convenient means for obtaining a neat joint between a wall 21 and the combination unit.

Although any appropriate sheet metal such as metal of the so called stainless steel type, copper, brass or the like may be employed for the top 3, it is preferred to utilize a sheet of an alloy containing about two-thirds nickel and one-third copper and sold under the trade mark "Monel". This nickel-copper alloy has work hardening properties which cause a hardening of the metal after it is stamped or drawn in a die. The worked metal produces a harder and more rigid structure than a metal having no work hardening properties. In addition, this nickel-copper alloy is possessed with non-corrosive features and is capable of resisting alkalis of soaps, washing powders, and the like and is also capable of resisting the destructive action due to organic acids occurring in foods, greases, fats, wash water and other substances commonly occurring or used in connection with a kitchen sink and range. It has a beautiful silver sheen which wears indefinitely.

The cabinet structure comprises, broadly speaking, three main sections 22, 23 and 24 which may be mounted on and suitably secured to a base 25 adapted to rest on the floor of a kitchen.

The section 22 is at the center of the unit and therefore directly under the basin 4. A bottom rail 26, side rails 27 extending from the base 25 to the apron 18 and a top rail 28 surround and form a casing for an opening 29. Doors 30 are suitably hinged to the structure to provide a closed compartment in which cooking utensils, soap, washing powders and the like may conveniently be kept. Preferably a concealed hinge 30a of conventional type is used. Handles 31 are secured to the doors to facilitate opening. The top rail 28 is wide enough to extend substantially to the horizontal plane of the bottom of the basin 4 and has louvres 32 pressed therein for ventilating the cabinet space. Water and sewer connections are easily made through the opening 29. One or more shelves, not shown, may be provided in this compartment, if desired.

The section 23, at the left end of the unit, is provided with side and bottom rails 33 and 34, respectively, which form a casing for an opening 35. In the modification shown, three drawers 36, 37 and 38 occupy this opening, suitable runs, such as illustrated by reference character 37a, being secured at the sides of the structure to support and guide the drawers. Suitable pulls 39 are secured to the face of the drawers.

In certain instances when it is desired to incorporate a refrigerator in the unit, drawers 36, 37 and 38 are dispensed with. The refrigerator, preferably of the mechanical type, can be slipped into section 23 from the front, this section being so dimensioned as to accommodate a conventional size of refrigerator.

The section 24, at the right end of the unit, is adapted slidably to receive the aforementioned range G, and is so dimensioned as to accommodate a conventional size of gas or electric range. In the drawing the gas range is illustrated as a four burner gas range with an oven, but an electric or other type of range could also be used, if desired.

The gas range G, which is bodily slidable into the compartment of section 24, may comprise side rails 40 and a bottom rail 41 forming a casing for an opening 42 in which a door 43 for the front of the oven is hinged in conventional manner. Runs, such as shown at 44, are provided at the sides of the compartment of section 24 on which the range G may be supported and guided into the compartment from the front. The oven door is provided with a handle 45 to facilitate opening and closing. The oven control is shown at 46.

The top of the range, as mentioned hereinbefore, is part of the sheet metal top 3 and the ports 9 therein are so arranged that the top burners 10 of the range are centrally located with respect thereto when the range is slipped into the compartment on runs 44. The handles of the cocks controlling the flow of gas to the jets are shown at 47.

The cabinet structure 2 is preferably made of sheet metal. The details of construction are well understood by those skilled in the art and need not be described in greater detail. The exposed surfaces may be enameled in attractive colors to harmonize with the range and refrigerator.

It will be observed that the present invention provides a compact, convenient and attractive kitchen unit which combines a sheet metal sink and drainboard with cabinet space, a range and, if desired, a refrigerator. In a commercial unit that has found wide acceptance the space occupied by the complete unit is less than 40 cubic feet. The unitary sheet metal top 3 is free from joints where dirt could accumulate and bacteria thrive. It may be kept in a sanitary condition with very little effort.

It will be further observed that the invention provides a unit which is well adapted for production on a commercial and industrial scale. The cabinet structure with the top attached can be made up at a sheet metal worker's plant with the end sections 23 and 24 left open for reception after installation, of the refrigerator and range. The range and refrigerator can be manufactured in mass production at plants equipped therefor as standard articles of equipment.

It will also be noted that installation of the unit is simple and efficient. The sewer and water connections are readily made by a plumber through opening 29. The refrigerator can be slipped into place by the service man from the electrical dealer, suitable connections being made to wall or floor outlets located under or behind the cabinet structure. Similarly the installation of the range may be made by the service man from a gas company.

Although a preferred embodiment of the invention has been illustrated and described, it is to be observed that modifications and variations may be resorted to without departing from the spirit and scope of the invention. For example, the bowl of the sink instead of being pressed from the unitary top member 3 could be made as a separate piece and welded to the member 3, as is well understood by those skilled in the art. Moreover, the relative positions and/or size of the sink, range and refrigerator can be arranged as desired.

I claim:

1. As a combination kitchen unit, a cabinet constructed of sheet metal comprising a unitary stain and corrosion resistant top member having an integral, substantially straight, narrow, imperforate apron depending from the front edge thereof; a base member of substantially the same length as said apron; rails extending from said base member to said apron dividing the cabinet into a plurality of compartments with open fronts; runs mounted at the sides of one of said compartments; a gas stove having at least one top burner slidably inserted bodily into said compartment on said runs with the burner located at the proper distance from the top member; said top member having a burner port registering with said burner; a door; and means pivotally mounting said door at the open front of an adjacent compartment.

2. As a combination kitchen unit, a cabinet constructed of sheet metal comprising a unitary stain and corrosion resistant top member having an integral, substantially straight, narrow, imperforate apron depending from the front edge thereof; a base member of substantially the same length as said apron; rails extending from said base member to said apron dividing the cabinet into a plurality of compartments with open fronts; runs mounted at the sides of one of said compartments; a gas stove having at least one top burner slidably inserted bodily into said compartment on said runs with the burner located at the proper distance from the top member; said top member having a burner port registering with said burner; a sink bowl in said top member extending into a second of said compartments; a door; and means pivotally mounting said door at the open front of said second compartment.

3. A unitary sink, drain board and gas stove top, made from an elongated sheet of stain and corrosion resisting metal comprising a sink bowl pressed from the plane of said sheet, an area adjacent to said sink bowl adapted to function as a drain board, and a second area constituting said gas stove top provided with a burner port adapted to register with a top burner of a gas range, said sheet having an integral raised rim at the ends and along one longitudinal edge, a relatively narrow, imperforate, substantially straight apron depending from said longitudinal edge, the other longitudinal edge being provided with an integral splash back extending substantially the entire length of said sheet, said splash back having flanges extending rearwardly from its ends and top edge, said second area being also provided with an exhaust port for products of combustion located between said burner port and said splash back.

HERBERT DAVID TIETZ.